US007006203B1

(12) United States Patent
Book et al.

(10) Patent No.: US 7,006,203 B1
(45) Date of Patent: Feb. 28, 2006

(54) VIDEO GUIDANCE SENSOR SYSTEM WITH INTEGRATED RANGEFINDING

(75) Inventors: Michael L. Book, Huntsville, AL (US); Thomas C. Bryan, Huntsville, AL (US); Richard T. Howard, Huntsville, AL (US); Fred Davis Roe, Jr., Huntsville, AL (US); Joseph L. Bell, Huntsville, AL (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/646,000

(22) Filed: Aug. 21, 2003

(51) Int. Cl.
*G01C 3/08* (2006.01)

(52) U.S. Cl. .................. 356/5.01; 356/5.04; 356/5.06
(58) Field of Classification Search ....... 356/5.01–5.08
See application file for complete search history.

(56) References Cited

U.S. PATENT DOCUMENTS

| 3,848,999 | A | * | 11/1974 | Dall'Armi | ................ | 356/5.04 |
|---|---|---|---|---|---|---|
| 4,386,848 | A | * | 6/1983 | Clendenin et al. | ......... | 356/5.01 |
| 4,942,561 | A | | 7/1990 | Ohishi et al. | | |
| 5,102,218 | A | | 4/1992 | Min et al. | | |
| 5,180,922 | A | | 1/1993 | Hug | | |
| 5,835,199 | A | * | 11/1998 | Phillips et al. | ............. | 356/5.03 |
| H1783 | H | * | 2/1999 | McLean | .................... | 356/5.04 |
| 5,870,180 | A | * | 2/1999 | Wangler | .................... | 356/4.01 |
| 5,953,109 | A | | 9/1999 | Lai et al. | | |
| 6,031,601 | A | * | 2/2000 | McCusker et al. | ......... | 356/5.01 |
| 6,369,880 | B1 | | 4/2002 | Steinlechner | | |
| 6,400,447 | B1 | | 6/2002 | Kirk et al. | | |

* cited by examiner

*Primary Examiner*—Thomas H. Tarcza
*Assistant Examiner*—Isam Alsomiri
(74) *Attorney, Agent, or Firm*—James J. McGroary; Ross F. Hunt, Jr.

(57) ABSTRACT

A video guidance sensor system for use, e.g., in automated docking of a chase vehicle with a target vehicle. The system includes an integrated rangefinder sub-system that uses time of flight measurements to measure range. The rangefinder sub-system includes a pair of matched photodetectors for respectively detecting an output laser beam and return laser beam, a buffer memory for storing the photodetector outputs, and a digitizer connected to the buffer memory and including dual amplifiers and analog-to-digital converters. A digital signal processor processes the digitized output to produce a range measurement.

24 Claims, 1 Drawing Sheet

VIDEO GUIDANCE SENSOR SYSTEM WITH INTEGRATED RANGEFINDING

ORIGIN OF THE INVENTION

This invention was made by employees of the United States Government and may be manufactured and used by or for the Government for governmental purposes without the payment of any royalties.

FIELD OF THE INVENTION

The present invention relates to, although is not limited to, automated docking systems for space vehicles and, more particularly, the present invention relates to a video guidance sensor system for such docking systems incorporating an integrated rangefinding capability.

BACKGROUND OF THE INVENTION

Prior art techniques used in determining the range between two spacecraft vehicles for automatic rendezvous and docking of such vehicles, includes vehicle radar, man in loop estimates, global positioning systems, lasers, loran, and video guidance sensor systems for processing optical images in determining range. The video guidance sensor system approach, which is of particular importance here, is based on the concept of using captured and processed images to determine the relative positions and attitudes of a video guidance sensor and a target. However, conventional video guidance sensor systems tend to be bulky, heavy, and slow, and have high power requirements or demands.

One prior video guidance sensor system uses two lights of predetermined wavelengths to illuminate a target. The target includes a pattern of filtered retroreflectors to reflect light. The filtered retroreflectors pass one wavelength of light and absorb the other. Two successive pictures or images are taken of the reflected light and the two images are then subtracted one from the other, thereby allowing for target spots to be easily tracked. However, due to its size, weight, power requirements and speed, the prior art video guidance sensor system is of limited use in applications requiring fast tracking of moving objects. Such a system is described, for example, in R. Howard, T. Bryan, M. Book, and J. Jackson, "Active Sensor System for Automatic Rendezvous and Docking," SPIE Aerosense Conference, 1997, which is hereby incorporated by reference.

Another prior art video guidance sensor system uses a CMOS imaging chip and a digital signal processor (DSP) in order to provide higher-speed target tracking and higher-speed image processing. The faster tracking rates result in a more robust and flexible video guidance sensor. Because of these faster tracking rates, the video guidance sensor system can track faster moving objects or provide more data about slower moving objects. This video guidance sensor system is designed to be less complex, consume less power and volume and weigh less than previous systems. However, this video guidance sensor system has limitations with respect to extended rangefinding. Such a system is described, for example, in R. Howard, M. Book and T. Bryan, "Video-based sensor for tracking 3-dimensional targets," Atmospheric Propagation, Adaptive Systems, & Laser Radar Technology for Remote Sensing, SPIE Volume 4167, Europto Conference, September 2000, and in R. Howard, T. Bryan, and M. Book, "The Video Guidance Sensor: Space, Air, Ground and Sea," GN&C Conference, 2000, which are also hereby incorporated by reference.

A general problem with the conventional video guidance systems of particular concern here is that beyond the distance at which the spots of the target on the vehicle merge into a single "blob," the system cannot determine from the image the range to the target and can only determine the bearing to the target. This limitation with respect to rangefinding creates a gap between the maximum tracking range for the vehicle guidance sensor system and the minimum safe range, when using simple absolute Global Positioning System (GPS) state vector navigation. In this regard, a two to five kilometer range capability has been discussed as the safe range for the transition from simple GPS.

A number of approaches have been proposed to "fill the gap" in question, but these involve complex sensor arrangements which add further sensors, more mass, and greater power demands, frontal area and costs to the chase vehicle incorporating these arrangements. Many modern laser rangefinders use simple pulse detectors which require pulse laser illuminators with high voltage power supplies (i.e., voltage greater than 28 VDC), capacitive discharge pulse laser drivers, special pulse laser diodes, and high speed detectors, and these requirements are problematic for space applications. Other conventional rangefinders use sinusoidal amplitude modulation and phase measurement which requires complex circuitry and precise gain control and/or complex frequency control circuitry for range measurements.

SUMMARY OF THE INVENTION

In accordance with the invention, digital signal processing (DSP) techniques are employed in combination with high speed digitizers and low speed optical signals to enable a basic video guidance system such as described above to measure the time of flight to targets even when the video guidance sensor system can only image the target as a single spot. This is achieved in a relatively inexpensive manner because of the limited modifications necessary in the existing hardware and software. The invention also enables the control of return signal levels with minimum additional hardware and software.

In accordance with one aspect of the invention, there is provided a video guidance sensor system including an integrated range measuring capability, the system comprising:

a video guidance sensor including:

means, including a stationary tilted mirror and a laser illuminator for producing an output having an amplitude which is controllable in real-time, for directing output light for reflection from a target such that return light reflected by said target is received by said sensor;

a camera for providing video images of the return light and producing a corresponding video output signal which is stored by the system;

a signal processing unit, for controlling the camera, processing the stored video output signal and for producing a corresponding output signal; and a communications computer for receiving sensor commands and transmitting said output signal from the signal processing unit; and a time of flight range measuring sub-system for measuring a time period taken by output light to travel to the target and to be received as return light, said range measuring sub-system comprising:

a first photodetector for directly receiving the output light and for producing a corresponding output signal;

a second photodetector for receiving the return light and for producing a corresponding output signal; and a digitizer, comprising at least one analog to digital converter, for receiving the output signals from said first and second photodetectors and for producing corresponding digital data;

said signal processing unit comprising a digital signal processor for processing the digital data produced by said digitizer to produce an output representative of said time period and thus of the range to the target, and for supplying said output to said communications computer.

Preferably, the digitizer further comprises at least one programmable gain amplifier, connected upstream of said at least one analog to digital converter, for receiving said output signals from said first and second photodetectors.

Advantageously, said at least one analog to digital converter comprises dual analog to digital converters and said at least one programmable gain amplifier comprises dual programmable gain amplifiers.

In an important implementation, the video guidance sensor further comprises a buffer memory, connected between said digitizer and said digital signal processor, for storing said digital data prior to processing thereof by said digital signal processor. Advantageously, the buffer memory comprises a first-in, first-out memory.

Preferably, the light source is switched between a first optical power level for operation of the system as a video guidance sensor, and a second optical power level for operation of the system as a range measuring device. Preferably, the light source comprises at least one laser diode and a laser driver for the at least one laser diode, and the second power level is approximately one-half of the first power level. Advantageously, the first power level is 100% power and said second power level is 50% power. The at least one laser diode is preferably operated at 10–20 kHz with a lower than 1 microsecond risetime.

Preferably, the video guidance sensor operation includes spot, acquire and slow tracking measurement cycles and the range measurement operation is alternated with said measurement cycles for target distances over a range from 15–30 meters to 1–5 kilometers.

In another important implementation, the time of flight range measuring sub-system measures said time period based on detection of a reflection transition in the return light, and a fixed fraction trigger event criteria is used for detection of each reflection transition in each cycle of the range measurements. Preferably, the range measuring sub-system uses the fixed fraction trigger event criteria to calculate a middle point of the slope of the return signal transition, and a plurality of readings of multiple range measurement cycles made in the frame time are averaged to produce an averaged reading. Advantageously, the range measuring sub-system determines said middle point as being halfway between 10% and 90% of the averaged reading.

In accordance with a further aspect of the invention, there are provided, in a video guidance sensor system comprising a video guidance sensor including means, including a laser light source, for directing output light onto a target located a distance from the video guidance sensor for reflection by the target so that return light reflected by the target is received by said sensor; a camera for providing video images of the return light and producing a corresponding video output signal; a signal processing unit, connected to the camera, for receiving and processing the video output signal and for producing a corresponding output signal; the improvements wherein:

a time of flight range measuring sub-system is integrated into said video guidance sensor;

said system is alternately operated in a range measuring mode and a video guidance sensor mode, said range measuring sub-system comprises first and second matched photodetectors for receiving said output light and said return light, respectively, and for producing corresponding output signals, and a digitizer, including programmable gain amplifiers and analog to digital converters, for digitizing said output signals and for producing corresponding outputs; and said signal processing unit comprises a digital signal processor for processing said outputs to produce an output related to the distance to the target.

As in the first aspect of the invention, a buffer memory is connected between the digitizer and the digital signal processor for storing said digital data prior to processing thereof by said digital signal processor. Again, the buffer memory advantageously comprises a first-in, first-out memory.

Preferably, the laser light source is switched between a first optical power level for operation of the system in said video guidance sensor mode, and a second, different optical power level for operation of the system in said range measuring mode. Advantageously, the second power level is approximately one-half of the first power level, and, in a preferred implementation, the first power level is 100% power and said second power level is 50% power.

Preferably, the laser light source comprises at least one laser diode operated at 10–20 kHz with a lower than 1 microsecond risetime.

Preferably, operation in the video guidance sensor mode includes spot, acquire and slow tracking measurement cycles and operation in said range measurement mode is alternated with said measurement cycles for target distances over a range from 15–30 meter to 1–5 kilometers.

As in the first aspect of the invention, the time of flight range measuring sub-system preferably measures said time period based on detection of a reflection transition in the return light, and a fixed fraction trigger event criteria is used over a plurality of cycles in detection of the reflection transition. Further, the range measuring sub-system preferably uses said fixed fraction trigger event criteria to calculate a middle point of slope of the return signal transition, and a plurality of readings of multiple range measurement cycles made in the frame time are averaged to produce an averaged reading.

Advantageously, as above, the range measuring sub-system determines said middle point as being halfway between 10% and 90% of the averaged reading.

Further features and advantages of the present invention will be set forth in, or apparent from, the detailed description of preferred embodiments thereof which follows.

BRIEF DESCRIPTION OF THE DRAWINGS

The single FIGURE in the drawings is a schematic diagram of a video guidance sensor system incorporating an integrated range measuring sub-system in accordance with a preferred embodiment of the invention.

DESCRIPTION OF THE PREFERRED EMBODIMENTS

Figure 1:
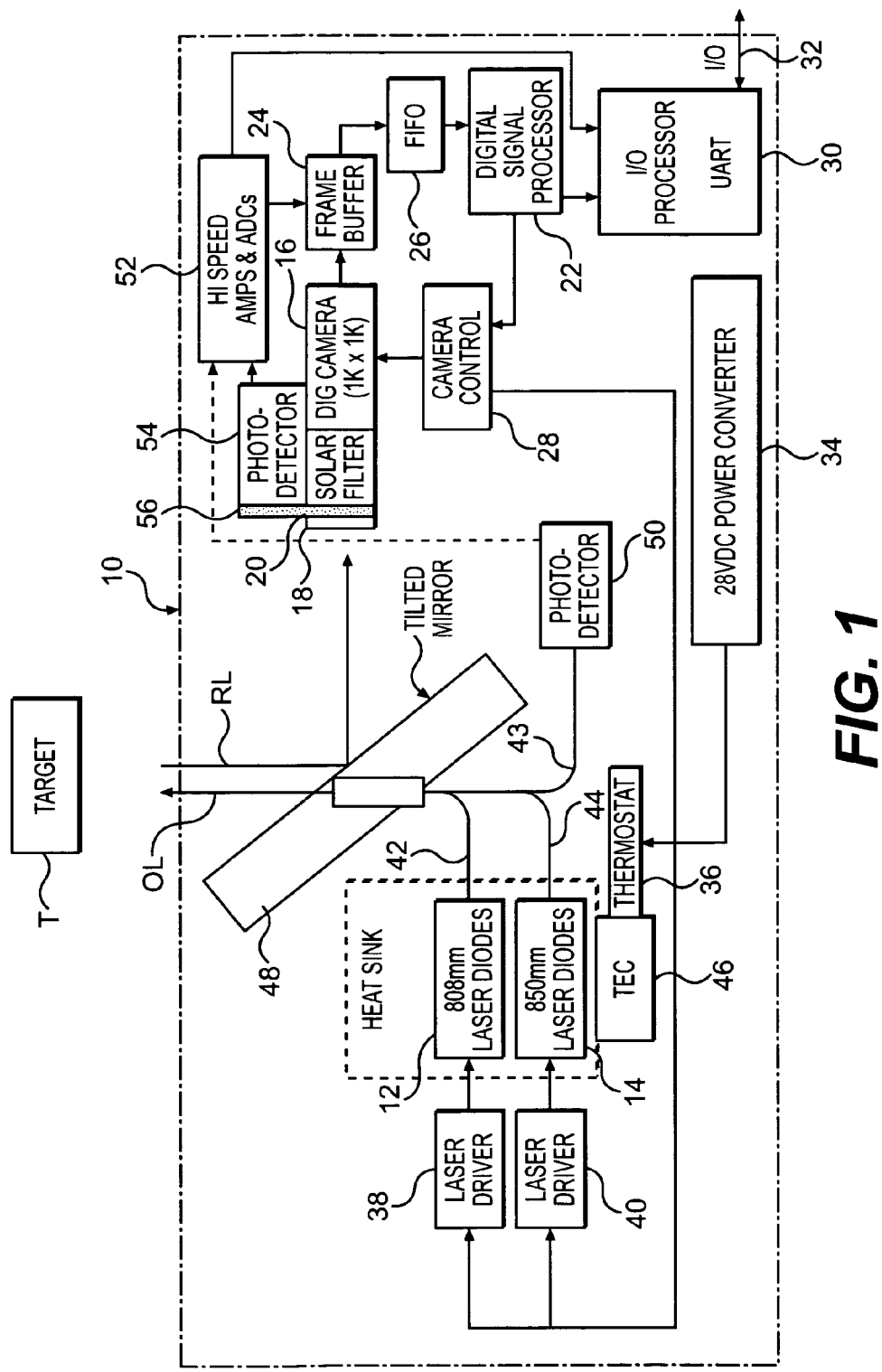

Referring to the single FIGURE of the drawings, there is shown a preferred embodiment of a video guidance sensor system with a range measurement capability. It will be understood that the basic video guidance system shown in FIG. 1 is similar to that disclosed in some of the references and patent applications described above, and incorporated by reference, and it is the rangefinding capability of the system of FIG. 1 that forms the present invention. Some of the units of the basic video guidance sensor system are modified, and other units have been added, to enable the rangefinding capability to be realized.

In general, the basic video guidance sensor, which is generally denoted 10, operates by sequentially firing two laser lights of different wavelengths of continuous wave laser diode illuminators, formed by laser diodes 12 and 14, at a target T which includes retroreflectors (not shown). However, in a preferred embodiment of the present invention, only the laser light from the 850 nm laser diodes 14 is reflected back by the filtered retroreflectors of target T so that the 808 nm laser diodes 12 are essentially useless for the range finding function.

A camera 16 captures light reflected from the retroreflectors of target T and provides video images to a frame buffer 24 for holding a bit-map picture. In front of the camera 16 are disposed a solar-rejection filter 18 that passes light at predetermined wavelengths while rejecting all other wavelengths, and a lens 20.

A signal processing unit in the form of a digital signal processor (DSP) 22 is electrically connected to the camera 16 via the frame buffer 24 and, in this case, a "lit pixel," first-in first-out (FIFO) memory circuit 26. DSP 22 receives an output signal from the frame buffer 24 during the video guidance sensor mode, and processes two images. More specifically, the digital signal processor 22 subtracts a received background image from a received foreground image and subsequently further subtracts a threshold image. The result is a low-noise image that is processed to find target "spots." Because the physical dimensions of the target are known, the relative positions and attitudes of the target can be computed from the target spots. The digital signal processor 22 also provides an electronic signal to a camera control and sub-window processor unit 28 in order to control the sync signals of the camera 16.

The digital signal processor 22 communicates with an input/output (I/O) processor 30. The I/O processor 30 basically acts as a system controller to handle various functions such as data management, system status, and system diagnostics, and controls the operation of the chase vehicle so as to enable docking of the chase vehicle with the target vehicle. The processor or computer 30 also includes input/output lines 32 in order to provide serial communication.

It will be appreciated that the signal processing unit 22 can be a digital signal processor or a digital microprocessor and that the processor 30 can be a single-board computer.

A 28 VDC power converter 34 supplies power to various components of the video guidance sensor 10 including electronic cards and temperature sensors including a thermostat 36 described in more detail below.

The video guidance sensor 10 also includes a pair of laser diode drivers 38 and 40 for driving the laser diodes 12 and 14. The processor/computer 30 controls the sequential operation of the laser diodes 12 and 14, via the laser diode drivers 38 and 40, respectively. In addition, the computer 30 coordinates the operation of the laser diodes 12,14 with the capturing and processing of the corresponding data images provided from the frame buffer 24. The laser diodes 12 and 14 operate at different predetermined wavelengths and as indicated above, in an exemplary embodiment, these wavelengths are 808 nm and 850 nm.

The laser diodes 12, 14 are fiber-optically coupled by fiber optic connections 42 and 44 so as to allow the laser outputs to be grouped near the lens of camera 16. More specifically, the fiber optic coupling provided by connections 42, 44 enables the outputs of the laser diodes 12, 14 to be positioned as near as possible to the bore of the sight of the camera 16 without interfering with the field-of-view (FOV) of camera 16.

There is physically disposed under the laser diodes 12 and 14 a thermoelectric cooler (TEC) 46 and the associated thermostat 36 mentioned above. The TEC 46 and thermostat 36 or thermostats 36 are used to keep the laser temperatures within their operating range.

A tilted mirror 48 is disposed at a 45 degree angle in front of the camera 16 in order to reduce the minimum operating range of the video guidance sensor system 10 while maintaining the same target configuration, field-of-view and operating speed. The outgoing laser beam is indicated at OL while the return laser beam from target T is indicated at RL and is received by digital camera 16 as described above. As indicated previously, the target T preferably comprises a passive target mounted on a target vehicle and includes filtered retroreflectors.

With a few changes and modifications, including the incorporation of FIFO 26 for reasons explained below, the video guidance sensor system 10 as described thus far basically corresponds to the video guidance sensor system described in the aforementioned article by R. Howard, M. Book and T. Bryan, "*Video-based sensor for tracking 3-dimensional targets,*" Atmospheric Propagation, Adaptive Systems, & Laser Radar Technology for Remote Sensing, SPIE Volume 4167, Europto Conference, September 2000, which has been incorporated by reference.

The range measuring capability of the video guidance sensor 10 is provided by the incorporation therein of a pair of matched photodetectors, viz., a first photodetector 50 connected by a fiber optic connection 43 to monitor the laser light supplied to tilted mirror 48, and connected electrically to a digitizer unit 52 comprising high speed amplifiers and analog-to-digital converters (ADCs), and a second photodetector 54, which has an associated lens 56, which receives the reflected laser light reflected by the target retroreflectors of target T, and which is also connected to digitizer 52. Photodetectors 50 and 54 are preferably a matched pair of high speed quad photodetectors while the amplifiers of unit 52 are programmable amplifiers and the ADCs of unit 54 are preferably A/D digitizers, with three or four A/Ds, for enabling coarse measurement of the return beam and for recording the laser output and return signals OL and RL.

The output of unit 52 is connected through frame buffer 24 and FIFO 26 to DSP 22 and hence to I/O processor 30, and is also connected directly to I/O processor 30. The output and return signal data is stored in the pixel FIFO 26 for C33 processing. The A/Ds of unit 52 output data faster than the DSP 22 can input the data, so that the data is buffered in FIFO 26 and processed by the DSP 22 at the speed it can handle. Alternatively, the FPGA that controls the FIFO 26 may also pre-process the data for faster processing.

As indicated above, in a preferred embodiment only the 850 nm laser diodes 14 are used, and, in accordance with a further aspect of the invention, the range measurements are carried out between the normal VGS measurements. In a specific implementation, the laser diodes 14 are toggled between programmable 100% and 50% of optical power levels at 10–20 kHz with lower than 1 microsecond risetime, with the lower optical power levels being used in the range measuring mode.

In operation, by using digital signal processing as described above, simple dual level modulation of the laser illuminator formed by laser diodes 14 (and mirror 48) and dual analog to digital conversion, by digitizer 52, of the outputs of the two matched photodetectors 50 and 54, enable the time of flight distance measurements to be made. As discussed above, the laser illuminator (diodes 14) is toggled between two programmed power levels, while the intensity of the outgoing laser beam or output light OL, and the light intensity of the reflected return beam or return light RL, are respectively sensed by the two matched photodetectors 50 and 54. Thereafter, as mentioned hereinbefore, the outputs of photodetectors 50 and 54 are digitized by the high-speed ADCs of digitizer 52 and stored by FIFO 26 for processing by DSP 22.

The DSP 22 can precisely determine the time between transitions in the outgoing and return signals even though the waveforms of these signals are slow, nonlinear or noisy. In this latter regard, it should be noted that in detecting the time of flight of the reflected transition in a return signal that has a variable amplitude, a fixed trigger level is no use. Because of this, the DSP 22 uses a fixed fraction trigger event criteria to calculate the middle point of the slope of the return signal transition, which is, for example, taken to be a point halfway between 10% and 90% of the average modulation return levels. The uncertainty of the measurement is one half of the clock sampling period, and by making multiple readings in the same frame time and averaging these readings, the signal jitter caused by random noise can be averaged out.

DSP 22 also determines the level of the return signal RL and adjusts the output levels of laser diodes 14 as well as the levels of the programmable gain amplifiers of digitizer 52.

It will be appreciated that with the modifications described above, the digitized temporal data can be inputted into the modified video guidance sensor system in place of the normal imager spatial data, operation of the VGS system can alternate between (a) time of flight measurements and (b) imaging measurements, using the basic timing optics, laser diode illuminators, data buffering, DSP processing, communications, power and structure of a VGS system, and without the addition of processors or additional substantial memory.

As indicated above, the hardware changes to the basic VGS system consist of, in a preferred embodiment thereof, (1) toggling of the 850 nm diode lasers 14 between programmable 100% and 50% optical power levels at 10–20 kHz with lower than 1 microsecond risetime; (2) using the matched pair of high speed photodetectors 50 and 54, with the programmable gain amplifiers and 40 Mhz A/D converters of digitizers 52, to record output and return signals OL and RL; and (3) storing of output and return data in FIFO 26 for C33 processing.

The basic software additions were also discussed above and, in a preferred embodiment, consist of: (1) using digital signal processing algorithms to measure output and return signal transitions to 40 mHz clock (3.75 m) precision and to enable auto-exposure; (2) filtering of multiple measurement cycles as discussed above to reduce noise error; and (3) alternating range measurement operation with "spot," "acquire," and "slow tracking" measurement cycles of normal VGS operation from 15–30 meters to 1–5 kilometers.

As described above, the invention is particularly useful in docking applications involving target and chase vehicles, the invention can also be used in other space applications including spacecraft station-keeping, circumnavigation, and docking and formation flying for space platform servicing. More general applications include automotive and other vehicular applications wherein the invention is used to track the closing distance to other vehicles as well as markers for landing strips.

Although the invention has been described above in relation to preferred embodiments thereof, it will be understood by those skilled in the art that variations and modifications can be effected in these preferred embodiments without departing from the scope and spirit of the invention.

What is claimed is:

1. A video guidance sensor system including an integrated range measuring capability, said system comprising:
   a video guidance sensor including:
      means, including a stationary tilted mirror and a laser light source for producing an output having an amplitude which can be controlled in real-time, for directing output light for reflection from a target such that return light reflected by said target is received by said sensor;
      a camera for providing video images of the return light and producing a corresponding video output signal;
      a signal processing unit, connected to the camera, for receiving and processing said video output signal and for producing a corresponding output signal; and
      a communications computer for receiving sensor commands and transmitting said output signal from the signal processing unit; and
   a time of flight range measuring sub-system for measuring a time period taken by output light to travel to the target and to be received as return light, said range measuring subsystem comprising:
      a first photodetector for directly receiving the output light and for producing a corresponding output signal;
      a second photodetector for receiving the return light and for producing a corresponding output signal; and
      a digitizer, comprising at least one analog to digital converter, for receiving the output signals from said first and second photodetectors and for producing corresponding digital data;
   said signal processing unit comprising a digital signal processor for processing the digital data produced by said digitizer to produce an output representative of said time period and thus of the range to the target and for supplying said output to said computer,
   said light source being switched between a first optical power level for operation of the system as a video guidance sensor, and a second optical power level for operation of the system as a range measuring device.

2. A system according to claim 1 wherein the digitizer further comprises at least one programmable gain amplifier, connected upstream of said at least one analog to digital converter, for receiving said output signals from said first and second photodetectors.

3. A system according to claim 2 wherein said at least one analog to digital converter comprises dual analog to digital converters and said at least one programmable gain amplifier comprises dual programmable gain amplifiers.

4. A system according to claim 1 wherein said video guidance sensor further comprises a buffer memory connected between said digitizer and said digital signal processor, for storing said digital data prior to processing thereof by said digital signal processor.

5. A system according to claim 4 wherein said buffer memory comprises a first-in, first-out memory.

6. A system according to claim 1 wherein said light source comprises at least one laser diode and a laser driver for the at least one laser diode.

7. A system according to claim 6 wherein said second power level is approximately one-half of the first power level.

8. A system according to claim 7 wherein said first power level is 100% power and said second power level is 50% power.

9. A system according to claim 6 wherein said at least one laser diode is operated at 10–20 kHz with a lower than 1 microsecond risetime.

10. A system according to claim 1 wherein the video guidance sensor operation includes spot, acquire and slow tracking measurement cycles and said range measurement operation is alternated with said measurement cycles for target distances over a range from 15–30 meters to 1–5 kilometers.

11. A system according to claim 1 wherein the time of flight range measuring sub-system measures said time period based on detection of a reflection transition in the return light and a fixed fraction trigger event criteria is used for detection of each transition in each cycle of the range.

12. A system according to claim 11 wherein said range measuring sub-system measurements uses said fixed fraction trigger event criteria to calculate a middle point of the slope of the return signal transition, and wherein a plurality of readings of multiple range measurement cycles are made in the frame time and are averaged to produce an averaged reading.

13. A system according to claim 12 wherein said range measuring sub-section determines said middle point as being halfway between 10% and 90% of the averaged reading.

14. In a video guidance sensor system comprising a video guidance sensor including means, including a laser light source, for directing output light onto a target located a distance from the video guidance sensor for reflection by the target so that return light reflected by the target is received by said sensor; a camera for providing video images of the return light and producing a corresponding video output signal; a signal processing unit, connected to the camera, for receiving and processing said video output signal and for producing corresponding output signal; and a computer for receiving said output signal from the signal processing unit, the improvements wherein:

a time of flight range measuring sub-system is integrated into said video guidance sensor;

said system is alternately operated in a range measuring mode and a video guidance sensor mode, said range measuring sub-system comprises first and second matched photodetectors for receiving said output light and said return light, respectively, and for producing corresponding output signals, and a digitizer, including at least one programmable gain amplifiers and at least one analog to digital converters, for digitizing said output signals and for producing corresponding outputs; and said signal processing unit comprises a digital signal processor for processing said outputs to produce an output related to the distance to the target.

15. A system according to claim 14 further comprising a buffer memory, connected between said digitizer and said digital signal processor, for storing said digital data prior to processing thereof by said digital signal processor.

16. A system according to claim 15 wherein said buffer memory comprises a first-in, first-out memory.

17. A system according to claim 14 wherein said laser light source is switched between a first optical power level for operation of the system in said video guidance sensor mode, and a second, different optical power level for operation of the system in said range measuring mode.

18. A system according to claim 17 wherein said second power level is approximately one-half of the first power level.

19. A system according to claim 18 wherein said first power level is 100% power and said second power level is 50% power.

20. A system according to claim 14 wherein said laser light source comprises at least one laser diode operated at 10–20 kHz with a lower than 1 microsecond risetime.

21. A system according to claim 17 wherein operation in the video guidance sensor mode includes spot, acquire and slow tracking measurement cycles and wherein operation in said range measurement mode is alternated with said measurement cycles for target distances over a range from 15–30 meter to 1–5 kilometers.

22. A system according to claim 14 wherein the time of flight range measuring sub-system measures said time period based on detection of a reflection transition in the return light, and a fixed fraction trigger event criteria is used for detection of each reflection transition in each cycle off the range.

23. A system according to claim 22 wherein said range measuring sub-system uses said fixed fraction trigger event criteria to calculate a middle point of slope of the return signal transition, and wherein a plurality of readings are made of multiple range measurement cycles in the frame time and are averaged to produce an averaged reading.

24. A system according to claim 23 wherein said range measuring sub-system determines said middle point as being between halfway between 10% and 90% of the averaged reading.

* * * * *